(12) United States Patent
Zaldua-Moreno et al.

(10) Patent No.: US 8,075,978 B2
(45) Date of Patent: Dec. 13, 2011

(54) METHOD FOR PRODUCING AN ANNULAR HONEYCOMB BODY, AND ANNULAR HONEYCOMB BODY

(75) Inventors: Naroa Zaldua-Moreno, Bonn (DE); Ferdi Kurth, Mechernich (DE); Rolf Brück, Bergisch Gladbach (DE)

(73) Assignee: EMITEC Gesellschaft fuer Emissionstechnologie mbH

( * ) Notice: Subject to any disclaimer, the term of this patent is extended or adjusted under 35 U.S.C. 154(b) by 768 days.

(21) Appl. No.: 12/045,048

(22) Filed: Mar. 10, 2008

(65) Prior Publication Data

US 2008/0199654 A1 Aug. 21, 2008

Related U.S. Application Data

(63) Continuation of application No. PCT/EP2006/008758, filed on Sep. 8, 2006.

(30) Foreign Application Priority Data

Sep. 9, 2005 (DE) .......................... 10 2005 043 196

(51) Int. Cl.
| | |
|---|---|
| *B32B 3/12* | (2006.01) |
| *B32B 15/00* | (2006.01) |
| *B01J 21/04* | (2006.01) |
| *B01J 8/02* | (2006.01) |
| *B21C 37/00* | (2006.01) |
| *B21B 13/00* | (2006.01) |
| *B21D 51/16* | (2006.01) |

(52) U.S. Cl. ......... 428/116; 502/429; 502/439; 428/594; 428/592; 428/603; 29/890; 422/211; 422/222

(58) Field of Classification Search ....................... None
See application file for complete search history.

(56) References Cited

U.S. PATENT DOCUMENTS

| 3,857,680 A | 12/1974 | Porta et al. |
| 3,890,104 A | 6/1975 | Porta et al. |
| 3,966,646 A | 6/1976 | Noakes et al. |
| 4,576,800 A * | 3/1986 | Retallick ....................... 422/180 |
| 5,464,679 A | 11/1995 | Maus et al. |
| 5,791,044 A * | 8/1998 | Whittenberger et al. ....... 29/890 |
| 6,458,329 B1 | 10/2002 | Wieres |

FOREIGN PATENT DOCUMENTS

DE 2 321 378 11/1973

(Continued)

OTHER PUBLICATIONS

Chinese Office Action dated Jul. 24, 2009.

*Primary Examiner* — Gordon R Baldwin
(74) *Attorney, Agent, or Firm* — Laurence A. Greenberg; Werner H. Stemer; Ralph E. Locher

(57) ABSTRACT

A method for producing a honeycomb body includes providing an annular radial partial region with channels through which a fluid can flow. The honeycomb body is formed from at least one metallic layer fastened at least at one fastening point to an outer casing tube. Each metallic layer has alternating substantially smooth and structured sections folded onto one another. A honeycomb body is also provided. The method and the honeycomb body advantageously permit an annular honeycomb body with low material expenditure and good durability to be produced.

21 Claims, 7 Drawing Sheets

FOREIGN PATENT DOCUMENTS

| | | |
|---|---|---|
| DE | 24 52 929 A1 | 5/1975 |
| DE | 35 06 610 A1 | 3/1986 |
| DE | 4215986 A1 | 11/1993 |
| DE | 19507299 A1 | 9/1996 |
| EP | 0 245 736 A1 | 11/1987 |
| EP | 0 322 566 A1 | 7/1989 |
| GB | 1427252 | 3/1976 |
| JP | 50148271 A | 11/1975 |
| JP | 1203044 A | 8/1989 |
| JP | 4103819 A | 4/1992 |
| JP | 7213919 A | 8/1995 |
| JP | 7308585 A | 11/1995 |
| WO | 94/01661 A1 | 1/1994 |
| WO | 97/23275 A1 | 7/1997 |

* cited by examiner

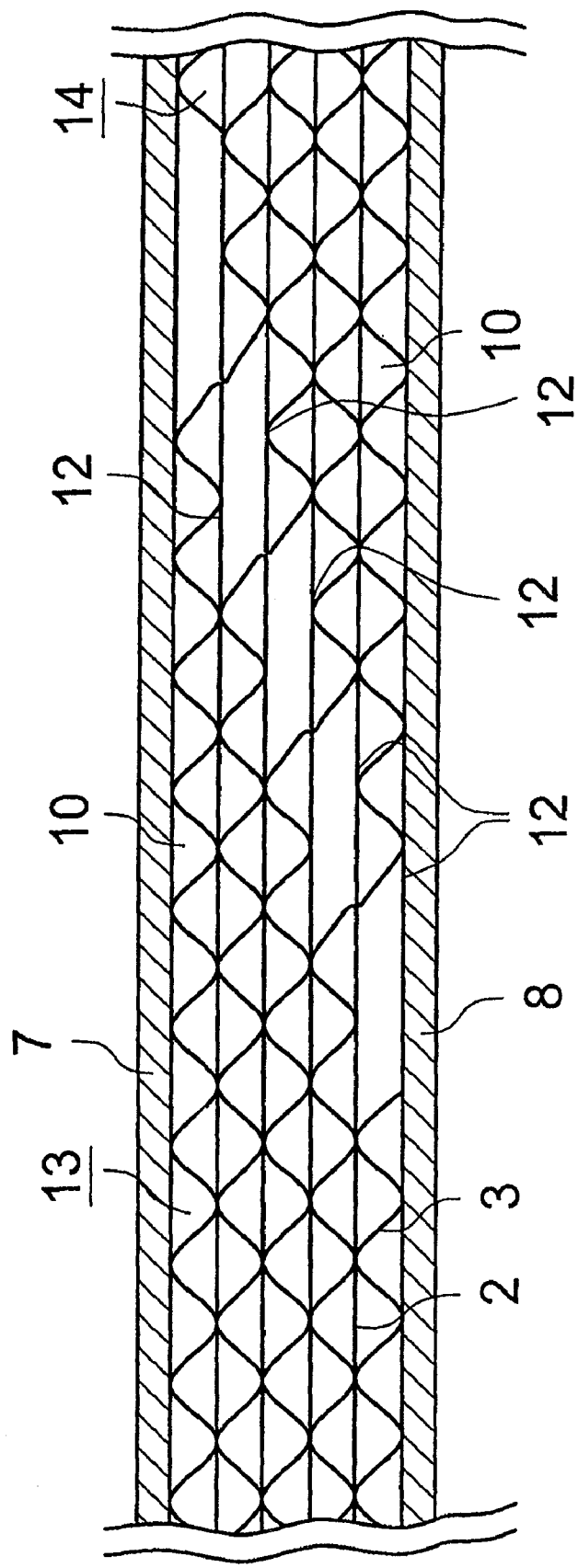

METHOD FOR PRODUCING AN ANNULAR HONEYCOMB BODY, AND ANNULAR HONEYCOMB BODY

CROSS-REFERENCE TO RELATED APPLICATIONS

This is a continuation, under 35 U.S.C. §120, of copending International Application No. PCT/EP2006/008758, filed Sep. 8, 2006, which designated the United States; this application also claims the priority, under 35 U.S.C. §119, of German Patent Application DE 10 2005 043 196.8, filed Sep. 9, 2005; the prior applications are herewith incorporated by reference in their entirety.

BACKGROUND OF THE INVENTION

1. Field of the Invention

The present invention relates to a method for producing an annular honeycomb body, and an annular honeycomb body. Honeycomb bodies of that type are preferably used in exhaust systems of internal combustion engines, in particular in motor vehicles, water vehicles and/or aircraft, for example as a catalyst carrier body and/or particle filter.

In many countries, the emissions of internal combustion engines must adhere to legal limit values, for example in such a way that the emitted quantity of a certain exhaust gas component may not exceed a limit value. For many of those limit values, exhaust-gas treatment is necessary. For that purpose, the exhaust gas of the internal combustion engine is, for example, conducted through a catalyst carrier body and/or a particle filter which is set up in such a way that a reduction in the proportion of the exhaust-gas component in the exhaust gas takes place. That can take place, for example, by providing a catalytically active coating, which for example includes active noble metals, on a honeycomb body.

It can be advantageous to use an annular honeycomb body, depending on the available installation space for components for exhaust-gas treatment. It can, for example, be advantageous to split up an exhaust-gas flow and subject each partial flow to a separate treatment. That can occur, for example, in such a way that a first partial flow flows through an annular, for example circular-ring-shaped first honeycomb body and a second partial flow flows through a second honeycomb body which is, for example, situated in the interior of the circular-ring-shaped first honeycomb body.

Annular carrier bodies are basically known. For example, European Patent EP 0 245 736 B1 discloses an annular honeycomb body with a plurality of layers, which run in an involute fashion, between an inner and an outer casing tube. A method for producing a honeycomb body of that type is known from European Patent EP 0 322 566 B1 in which a plurality of layers is fastened, using a complex process, to an inner tube, to one another and to an outer tube. German Published, Non-Prosecuted Patent Application DE 23 21 378 A1, corresponding to U.S. Pat. Nos. 3,857,680 and 3,890,104, discloses an annular honeycomb body which is produced from a smooth sheet metal strip that is folded and is connected to an inner and an outer casing tube. A honeycomb body of that type has an insufficient surface area, with respect to the volume and the annular cross section, which can be provided with a catalytically active substance. For example, for a given annular cross section, a relatively large-volume honeycomb body must be produced in order to provide a certain surface area, for example for a catalytically active coating. International Application No. WO 94/01661 A1, corresponding to U.S. Pat. Nos. 5,464,679; 5,608,968; and 5,785,931, in turn discloses a production method in which a smooth layer and a corrugated layer are wound in a circular ring shape, then deformed from the outside inward at least at three lines, and the resulting star-like structure is then twisted in the same direction. In order to separate corrugated layers which would otherwise bear against one another, it is proposed therein to insert at least one smooth layer section between the corrugated layers. That results in increased material expenditure.

SUMMARY OF THE INVENTION

It is accordingly an object of the invention to provide a method for producing an annular honeycomb body and an annular honeycomb body, which overcome the hereinaforementioned disadvantages of the heretofore-known methods and devices of this general type and in which the method can be carried out in a simple manner with low material expenditure with the annular honeycomb body having a sufficiently large surface area per unit volume of the honeycomb body and per unit annular cross section.

With the foregoing and other objects in view there is provided, in accordance with the invention, a method for producing a honeycomb body. The method comprises providing at least one metallic layer with alternating substantially smooth and structured sections, folding the sections of each metallic layer onto one another, fastening the at least one metallic layer at least at one fastening point to an outer casing tube and forming the honeycomb body from the at least one metallic layer with an annular radial partial region having channels through which a fluid can flow.

An annular partial region is to be understood to mean a partial region which is surrounded at the outside by an outer delimiting line which, in the interior, has an open region, that is to say a region not provided with channels, which is surrounded by an inner delimiting line, with the outer and the inner delimiting lines preferably running substantially parallel to one another, in particular not intersecting one another. The delimiting lines can, in particular, have the geometric shape of a circle, an ellipse, a rectangle in which two opposite sides are replaced with corresponding semi-circles, and/or a polygon. In this case, an annular region is to be understood in particular to mean a circular-ring-shaped region.

Alternating means, in particular, that a substantially smooth section, which does not delimit the layer, has structured sections adjacent at both sides. Likewise, this means, in particular, that a structured section, which does not delimit the layer, has two adjacent substantially smooth sections. A structured section has structures which later at least partially form the walls of the channels. A structure is meant in particular, which has a structure amplitude and a structure repeat length. A substantially smooth section is to be understood to mean a section which is smooth, that is to say is deformed only during the folding and twisting and/or winding process, or else which has only microstructures with a structure amplitude that is smaller than the structure amplitude of the structured sections. The microstructures can, in particular, be aligned in such a way that, in the finished honeycomb body, the direction in which the microstructures extend and the direction in which the structures of the structured sections extend are not the same.

The structures, in particular, include corrugations. The corrugations can, in particular, be formed by a corrugated roller, but according to the invention it is, for example, also possible for embossing methods to be used to form the structures in the corresponding sections of the layer. The layer preferably includes a plurality of sections. The honeycomb body is preferably formed from one to six layers. The formation from a single layer is particularly preferable in this case.

A metallic layer is to be understood, in particular, to mean a thin metallic foil, preferably with a thickness of 80 micrometers (μm) or less, particularly preferably with a thickness of 30 to 60 μm or also 40 to 50 μm or even of 25 μm or less. It is also possible for a metallic layer to be formed completely or partially from a metallic material through which a fluid can at least partially flow and, in particular, is porous. In this case, the layer can, in particular, be formed at least partially from a porous metallic fibrous and/or sintered material. It is basically preferable for the metallic layer to be formed from a high-temperature-resistant, corrosion-resistant material which is suitable, in particular, for withstanding the conditions, for example the high temperatures, in the exhaust system of internal combustion engines, preferably also in applications close to the engine.

As a result of the connection of the at least one layer to the outer casing tube at least at one fastening point, a fixed connection between the layer and the outer casing tube is created, in particular when a plurality of fastening points is provided. It is possible, in particular, to dispense with an inner casing tube to which the layer is connected. In this case, a fastening point is to be understood to mean a punctiform connection, but also an areal connection. In particular, a connection is provided at least in one partial region of the layer, which bears against the outer casing tube.

The connection takes place, in particular, through the use of material joining processes, for example a brazing and/or welding process. In this case, a brazing process is to be understood, in particular, to mean a high-temperature vacuum brazing process. Alternatively or in addition, a force-locking and/or form-locking connection to the outer casing tube is also possible and encompassed by the invention, in particular also a self-locking connection. A connection of that type, based on mechanical latching, can also advantageously be used between the sections of the layer or between adjacent layers. A force-locking connection is one which connects two elements together by force external to the elements, as opposed to a form-locking connection which is provided by the shapes of the elements themselves.

In comparison with annular honeycomb bodies known from the prior art, the honeycomb body according to the invention, produced according to the invention, has a large available surface area, for example for a coating, per unit annular cross section and/or per unit volume of the honeycomb body. In comparison with production methods in which an intermediate layer, for example as a smooth layer, must be inserted, the material expenditure is considerably lower, and the production method is also simpler.

The structures of the structured sections can be formed in the layer, in particular through the use of rolling with a corrugated roller. A roller in which only one half is embodied as a corrugated roller, is preferable in this case. In this way, it is possible to produce a layer which has smooth and corrugated sections. In this case, that part of the roller which is not embodied as a corrugated roller can be provided in particular with a coating, for example a rubberized coating, through the use of which deformation of the sections is prevented. It is also possible according to the invention, during the production of the structured sections, to subject the layer to a rolling process with a corrugated roller which is raised from the layer when a substantially smooth section is to be formed.

In accordance with another mode of the method according to the invention, the sections are embodied in such a way that the substantially smooth sections have at least one first section length and the structured sections have at least one second section length which differs from the first section length.

An embodiment in which the substantially smooth sections substantially all receive an identical first section length and the structured sections substantially all receive an identical second section length is preferable in this case. After the folding of the sections, the layer has a parallelogram-shaped cross section which can, in particular, be configured in such a way that an annular honeycomb body can be constructed without turning or twisting. It is preferable in this case for the first section length to be greater than the second section length, in particular by approximately 1 to 10%, preferably by approximately 3 to 7%, in particular by substantially 5%.

In accordance with a further mode of the method according to the invention, the at least one layer is connected to an inner casing tube, with a relative rotation of the casing tubes with respect to one another taking place during production.

In this case, it is possible in particular for the inner casing tube to be rotated relative to the outer casing tube or for an opposite rotation of the two casing tubes to take place at the same time and/or in succession.

In accordance with an added mode of the method according to the invention, the connection between the at least one layer and the inner casing tube is detachable.

In this case, a form-locking and/or force-locking connection can preferably take place between the at least one layer and the inner casing tube. A method in which the inner casing tube is inserted merely as a twisting aid and is removed again after the twisting process, that is to say for example a rotation of the inner casing tube relative to the outer casing tube, is therefore preferable. The removal of the inner casing tube takes place, in particular, after the formation of a materially joined connection between the layers. A materially joined connection is to be understood herein in particular to mean a welded and/or a brazed connection, preferably a high-temperature brazed connection.

In accordance with an additional mode of the method according to the invention, the inner casing tube is removed after the rotation.

In accordance with yet another mode of the method according to the invention, the sections of each layer are separated by fold lines, with every second fold line being situated on one side of the layer and with at least one of the latter fold lines including at least one fastening point.

A fold line thus refers to the line along which the layer has been folded. A fold line is consequently situated between two adjacent sections. Every second fold line is situated on one side of the layer after carrying out the entire folding. In this case, the fold lines of the layer which point outward after the production of the honeycomb body are referred to as outer fold lines, while the fold lines of the layer which point inward after the production of the honeycomb body are referred to as inner fold lines. Each outer fold line is preferably fastened, in particular connected in a materially joined fashion, to the outer casing tube. It is also possible herein to use in particular brazing and/or welding processes, preferably hard soldering processes. In this case, the connection can be formed in each case over the entire length of the honeycomb body or else only in partial regions or else only in a punctiform fashion at a fastening point.

If an inner casing tube is formed permanently, that is to say in particular not only during the production process, it is also advantageously possible for a fastening of the at least one layer to the inner casing tube to be formed, in particular through the use of a material joining connecting process, such as in particular a brazing and/or welding process, in particular a high-temperature brazing process.

In accordance with yet a further mode of the method according to the invention, the structures are formed in the layer in a substantially periodic manner, with the structures having a structure repeat length and the structure repeat length being increased at least at one point of the layer.

The structure repeat length refers, in particular, to the spacing of one point of a structure to a corresponding point in the adjacent structure. In the case of a strictly periodic structure, the structure repeat length would correspond to the period of the structure. An increase in the structure repeat length can be obtained, in particular, in that one structure is elongated in terms of position in relation to other structures, or one structure is omitted. In particular, when the structured section is corrugated, it is possible for a part of a period or a period of the corrugation to be omitted.

This advantageous embodiment can also be realized independently of the method according to the invention. It is therefore advantageous to provide a method for producing an annular honeycomb body in which at least one layer, which is at least partially structured with structures having at least one structure repeat length, and if appropriate at least one substantially smooth layer, is wound or twisted in such a way that an annular region with channels through which a fluid can flow is formed, with at least two structure repeat lengths being different. An at least partially structured layer is to be understood, in particular, to mean a layer which is structured in partial regions and is not structured in partial regions, or else a construction composed of at least one structured and at least one substantially smooth layer. Winding or twisting at least one such layer is to be understood in particular to mean spiral winding of the layers or else stacking of at least one layer and subsequent twisting, in the same direction or opposite directions, of at least one stack. The term "different structure repeat length" is to be understood, in particular, to mean an embodiment of the method in which, basically, a structure with a structure repeat length and a structure amplitude are formed in the layer, with either at least one structure, for example, being elongated, that is to say with a locally different period being generated in the case of periodic structures, and/or at least one point at which the structure is not formed being generated. As a result of the latter, a gap is generated in the structures, that is to say basically that the period remains uniform in the case of periodic structures, but the structure repeat length changes as defined above.

This method can thus be carried out, independently of the above-described method according to the invention, from one layer with folded sections. It is possible, in particular, for the method described herein to also be carried out with methods known from the prior art for producing in particular, annular honeycomb bodies.

The method described herein with the different structure repeat lengths additionally achieves a further object, that is to say that of proposing a method for producing a honeycomb body and a honeycomb body which is, in particular, annular and which is suitable for absorbing the pressure forces generated internally or externally under the action of thermal heating.

The omitted and/or elongated structures advantageously make it possible for pressure forces in the honeycomb body to be compensated. In principle, the layer then acts as a type of pressure spring in which the region of the omitted structure and/or of the elongated structure can be deformed under pressure. The structure repeat lengths are preferably varied in such a way that, after the shaping of the honeycomb body, each radius of the honeycomb body has at least one region with an elongated structure repeat length. This advantageously permits a substantially radially uniform absorption of pressure stresses in the honeycomb body.

In accordance with yet an added mode of the method according to the invention, alternatively and/or in addition to the increased structure repeat length, at least one recess can be formed in at least one structured section.

The recess is preferably aligned perpendicularly to the repeat direction of the structurings, that is to say preferably in the longitudinal direction of the honeycomb body. The recess is preferably a slot which is formed in the layer. The slot can also advantageously serve for compensating the thermal expansion of the annular honeycomb body. The recesses are preferably formed in such a way that, after the shaping of the honeycomb body, each radius of the honeycomb body has at least one region with an elongated structure repeat length and/or a recess. This advantageously permits a substantially radially uniform absorption of pressure stresses in the honeycomb body.

The at least one recess can be formed in the layer, in particular, through the use of punching, perforating and/or cutting.

In accordance with yet an additional mode of the method according to the invention, recesses are formed in smooth and structured sections in such a way that, after the folding, a coherent cavity is formed.

It is possible, in particular, for a measuring sensor, preferably a lambda probe, to be inserted into the cavity.

In accordance with still another mode of the method according to the invention, a structured section, which delimits a layer, has a shorter construction than the other sections.

In accordance with still a further mode of the method according to the invention, a fastening of the layer at the fastening points takes place through the use of a material joining process.

A material joining process is to be understood, in particular, to mean a welding and/or brazing process. A high-temperature brazing process, which generates a hard-soldered connection at high temperatures, is preferable in this case. A brazing process is preferably used which ensures that the connection is durable at conventional temperatures in the exhaust system of internal combustion engines, in particular also in applications close to the engine.

In accordance with still an added mode of the method according to the invention, at least one of the following connections is generated in a materially joined manner at least in partial regions of the honeycomb body:
  a) a connection of the layer to an inner casing tube;
  b) a connection of the layer to the outer casing tube;
  c) a connection of the layer to itself; and
  d) a connection of a layer to an adjacent layer.

A connection according to item c) is to be understood in particular to mean a connection of one section to another section, preferably an adjacent section, in particular in partial regions of the respective sections. All of the connections according to items a), b), c) and d) can take place in partial regions of the layer or over the entire length of the layer. The connections according to items a) and b) can be formed not only in the region of the fold lines but can also be generated, for example, in the region of a substantially smooth and/or structured section which bears at least in regions against the casing tube. In this case, the connection of the layer and the inner and/or outer casing tube in the region of structure extrema of the structured regions is preferable. The connection can take place in each case over the entire length of the honeycomb body or else only in one or more partial regions of the length.

In accordance with still an additional mode of the method according to the invention, at least a part of a layer is formed from a metallic foil.

It is thus possible, in particular, for a thin sheet metal foil to be used. A construction in which, in a longitudinal direction, which corresponds to the throughflow direction of the honeycomb body, one partial region is embodied as a foil and another partial region is embodied as a region through which a fluid can at least partially flow, is also preferable.

In accordance with again another mode of the method according to the invention, at least a part of a layer is formed from a metallic material through which a fluid can at least partially flow.

This is to be understood, in particular, to mean a porous metallic material, in particular a fibrous material and/or a porous metallic sintered material.

With the objects of the invention in view, there is also provided a honeycomb body, comprising an outer casing tube, and at least one metallic layer fastened at least at one fastening point to the outer casing tube. The at least one metallic layer has alternating substantially smooth and structured sections folded onto one another. An annular radial partial region has channels through which a fluid can flow.

In accordance with another feature of the invention, the individual sections have a substantially involute curvature.

This is the case, in particular, when the outer casing tube and if appropriate the inner casing tube are substantially circular. The curvature of each individual section then follows substantially in particular an involute of a circle. The involute of a circle can be expressed in an x, y plane as follows:

$$x = a\cos\phi + a\phi\sin\phi,\ y = a\sin\phi - a\phi\cos\phi$$

In this case, the value a denotes the radius of the inner circle or of the inner casing tube.

In accordance with a further feature of the invention, the smooth sections have at least one first section length and the structured sections have at least one second section length which differs from the first section length.

In accordance with an added feature of the invention, an inner casing tube is provided, to which the at least one layer is connected at least in partial regions.

In accordance with an additional feature of the invention, the sections of each layer are separated by fold lines, with every second fold line being situated on one side of the layer and with at least one of the latter fold lines being connected at least in partial regions to the outer casing tube.

A substantially zig-zag-shaped folded layer is therefore provided wherein, with the exception of the sections which in each case delimit the layer, in each case a substantially smooth section is adjacent two structured sections and vice versa.

In accordance with yet another feature of the invention, the structures of the structured sections have a structure repeat length, with the structure repeat length being increased at least at one point of a layer.

The increase of a structure repeat length at least at one point of a layer creates a zone in the honeycomb body which can absorb pressure stresses. In that zone, a deformation of the structure, which is either structured differently or is not present in that region, is then possible.

The feature that the structures of the structured sections have a structure repeat length, with the structure repeat length being increased at least at one point of a layer, can also be realized individually in any desired, in particular annular, honeycomb body including metallic layers.

It is thus advantageous to form a honeycomb body which includes metallic layers that are at least partially structured, with the structured sections having a structure repeat length, and the structure repeat length being increased at least at one point.

This is preferably also suitable for an annular catalytic converter, which has an involute construction, with an in particular circular-ring-shaped section with channels through which a fluid can flow. The term at least partially structured layers is to be understood to mean a construction in which layers are formed that are partially structured or in which a plurality of layers is used, of which a part is structured and a part is substantially smooth.

In accordance with yet a further feature of the invention, at least one structured section has at least one recess.

The recess in a structured section and/or in a structured layer can also advantageously serve for absorbing pressure stresses in the event of inhomogeneous heating of the honeycomb body. This feature can also advantageously be realized individually and can be provided as an alternative and/or in addition to a structure repeat length which is increased at least at one point.

In accordance with yet an added feature of the invention, smooth and structured sections have recesses which form a coherent cavity.

The cavity can serve, in particular, for holding a measuring sensor, in particular a lambda probe.

In accordance with yet an additional feature of the invention, a materially joined connection is present in the fastening points or locations.

A materially joined connection is to be understood herein, in particular, to mean the formation of a brazing and/or welded connection, in particular a hard-soldered connection, at relatively high temperatures.

In accordance with again another feature of the invention, at least one of the following connections includes a materially joined connection:

a) a connection of the layer to an inner casing tube;
b) a connection of the layer to the outer casing tube;
c) a connection of the layer to itself; and
d) a connection of a layer to an adjacent layer.

Each of the connections a), b), c) and/or d) can also take place in a partial region of a layer. In this case, too, a materially joined connection is to be understood in particular to mean the formation of a brazed and/or welded connection. The connections according to items a) and b) can be formed not only in the region of the fold lines but can also be generated, for example, in the region of a substantially smooth and/or structured section which bears at least in regions against the casing tube. The connection of the layer and the inner and/or outer casing tube in the region of structure extrema of the structured regions is preferable in this case. The connection can take place in each case over the entire length of the honeycomb body or else only in one or more partial regions of the length.

In accordance with again a further feature of the invention, at least a part of a layer includes a metallic foil.

This is to be understood, in particular, to mean thin sheet metal foils with a thickness of 80 μm or less.

In accordance with a concomitant feature of the invention, at least a part of a layer is formed from a metallic material through which a fluid can at least partially flow.

These are, in particular, porous metallic materials. Examples of such materials are porous fibrous materials and/or sintered materials.

The details and advantages disclosed for the method according to the invention can be applied and transferred in the same way to the honeycomb body according to the invention, and vice versa. The honeycomb body according to the invention can, in particular, be produced in accordance with the method according to the invention.

Other features which are considered as characteristic for the invention are set forth in the appended claims.

Although the invention is illustrated and described herein as embodied in a method for producing an annular honeycomb body and an annular honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 is an enlarged, fragmentary, longitudinal-sectional view of a portion of a further exemplary embodiment of a honeycomb body according to the invention;

DETAILED DESCRIPTION OF THE INVENTION

Figure 1:
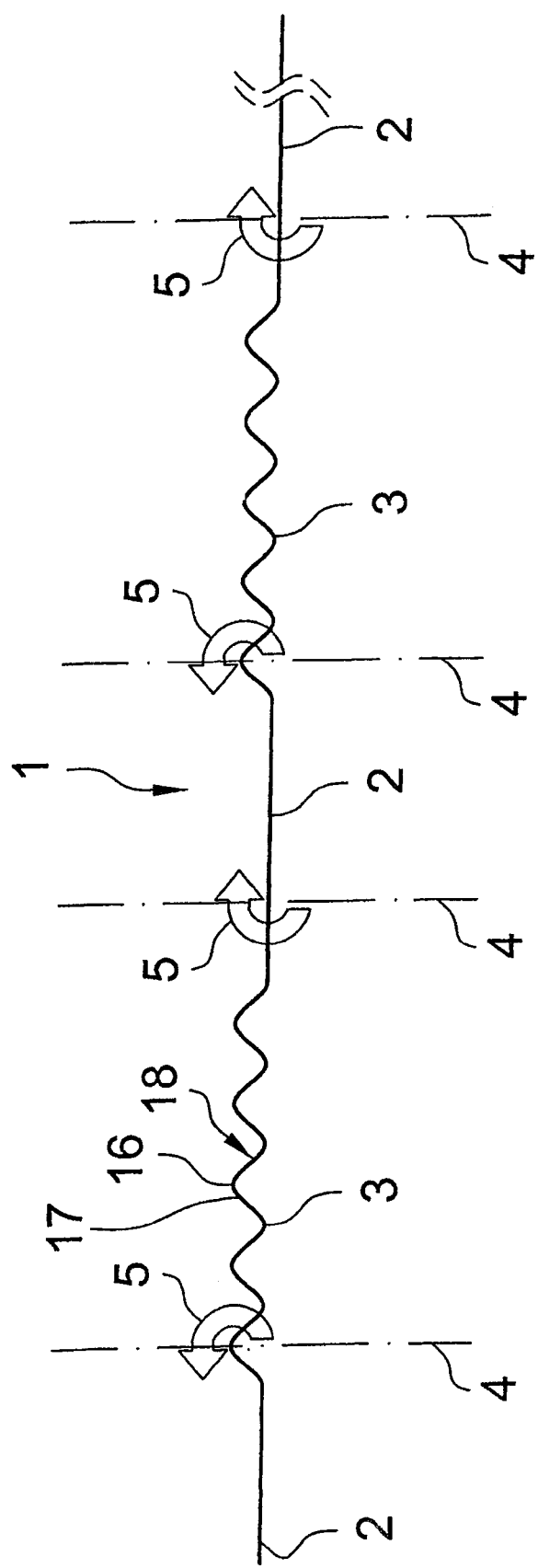
FIG. 1 is a diagrammatic, side-elevational view of an example of a layer for a honeycomb body according to the invention.
Figure 2:
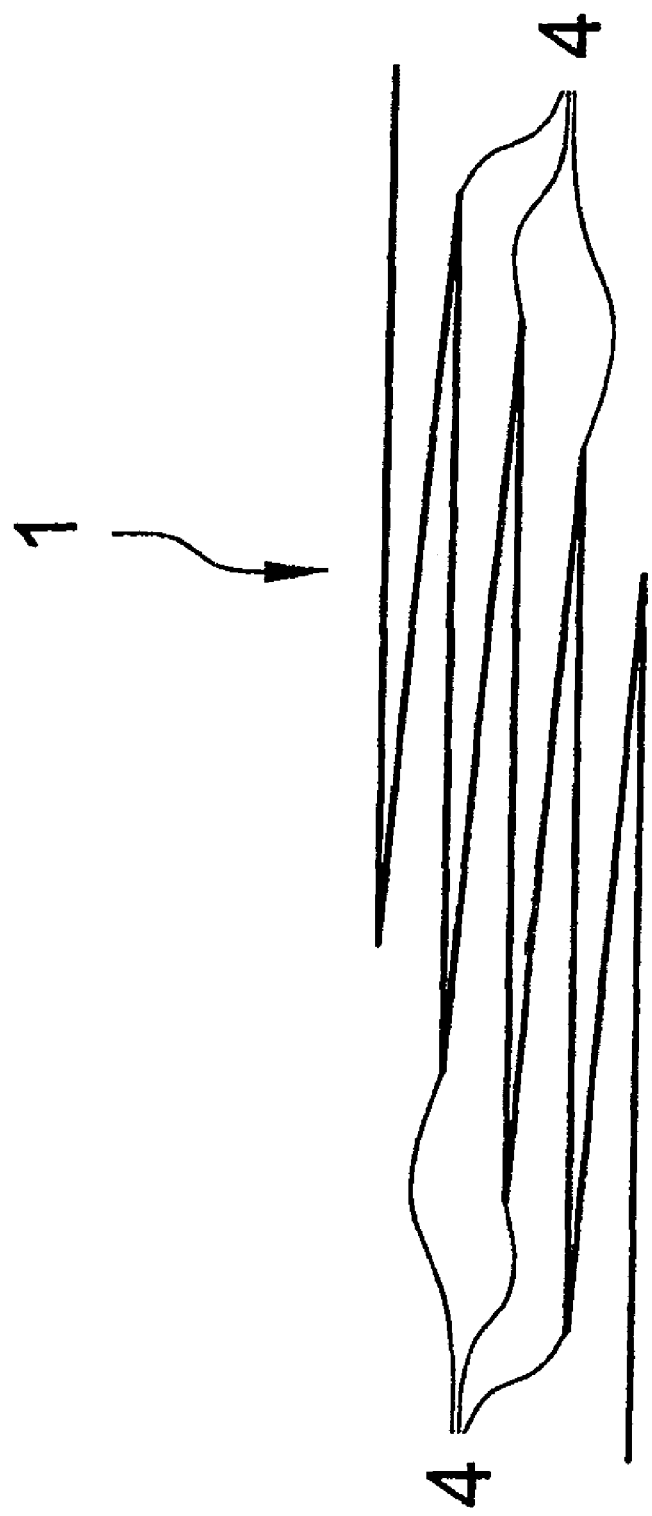
FIG. 2 is a side-elevational view of an already folded layer.

Referring now to the figures of the drawings in detail and first, particularly, to FIG. 1 thereof, there is seen a diagrammatic illustration of a layer 1 which can be used in a method according to the invention for producing a honeycomb body. The layer 1 has a plurality of alternating smooth sections 2 and structured sections 3. The sections 2, 3 are in each case separated by fold lines 4. A fold takes place in each case in a fold direction as indicated by arrows 5. This results in a folded layer as shown in FIG. 2.

As a result of the folding of the layer 1, the sections 2, 3 of each layer 1 are separated by the fold lines 4. Every second fold line 4 is situated in each case on one side of the layer 1. The fold lines 4 situated on one side of the layer 1 make it possible to carry out a fastening to an inner and/or outer casing tube. In this case, a connection takes place in at least one partial region of at least one part of the fold lines 4. Alternatively or in addition, the formation of a connection in the vicinity of the fold lines 4 is possible.

Figure 4:
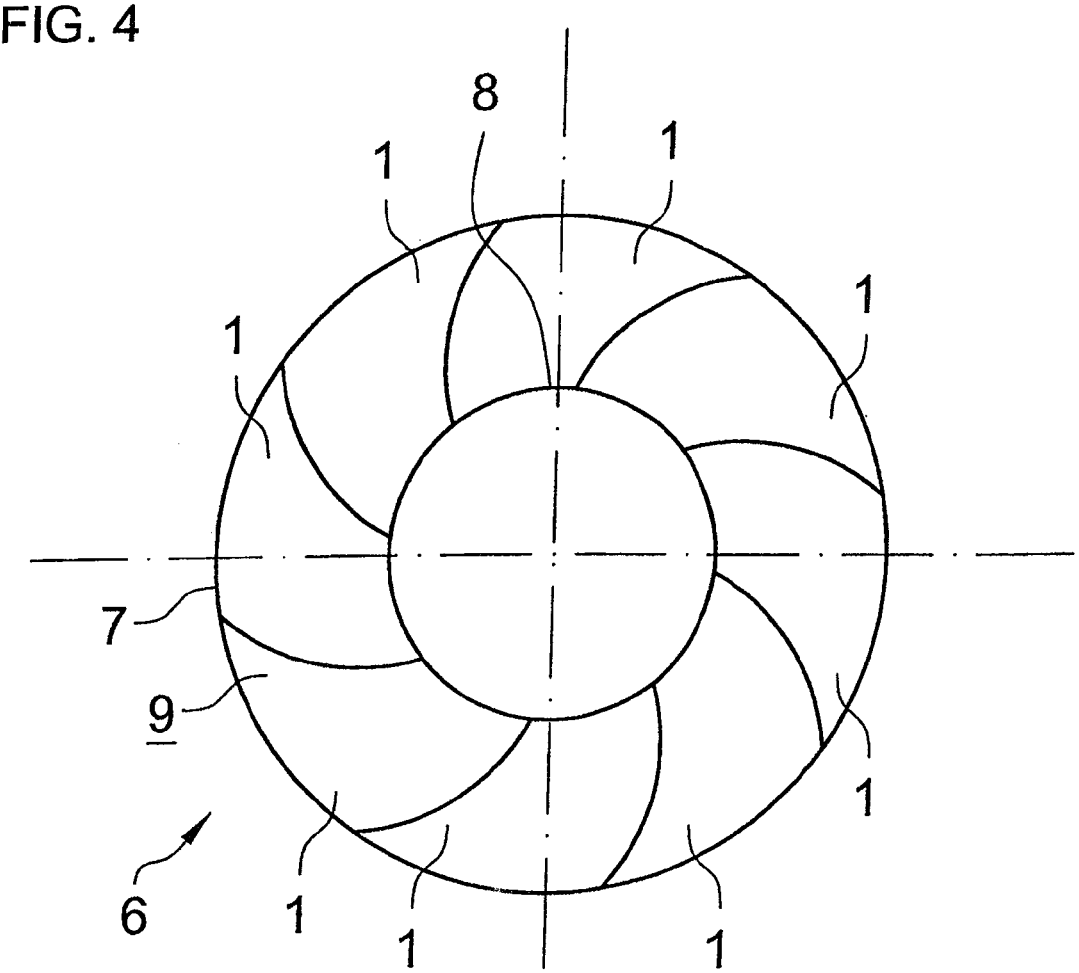
FIG. 4 is a cross-sectional view of a honeycomb body according to the invention.

The layer 1 has at least one fastening point 16 in which one section 2, 3 is fastened to an adjacent section 3, 2 or to an outer casing tube 7 or an inner casing tube 8 shown in FIG. 4. It is possible, in particular, for the fastening point 16 to extend over at least one partial region of a crest 17 of a structuring 18. The formation of a materially joined connection, in particular a welded and/or hard-soldered connection, is preferable.

Figure 3:
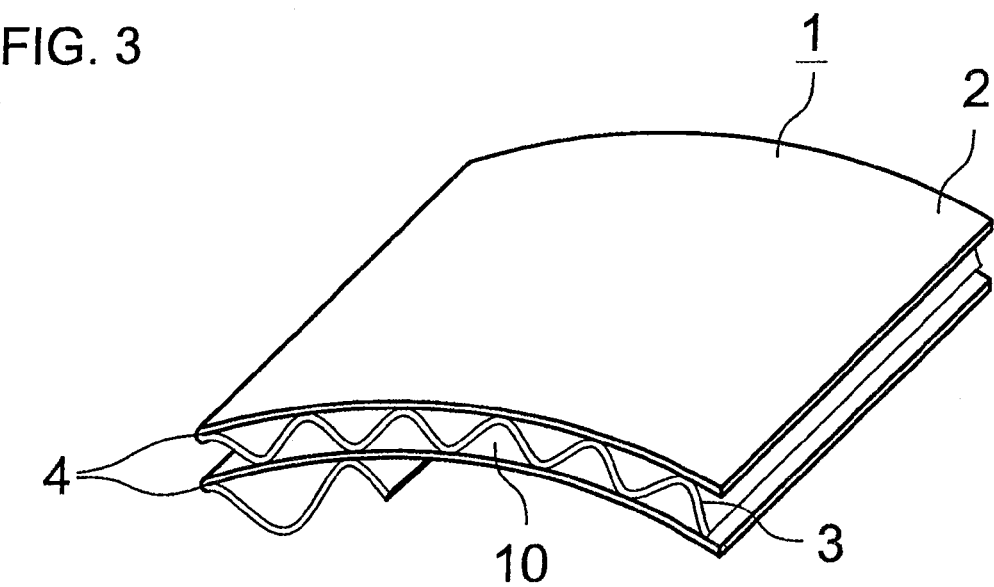
FIG. 3 is a fragmentary, perspective view of a portion of a layer of a honeycomb body according to the invention.

FIG. 3 diagrammatically shows a portion of a layer 1 in a perspective view. The layer 1 has smooth sections 2 and corrugated sections 3 which are separated by fold lines 4. The structured sections 3 and smooth sections 2 form channels 10, after the folding. A fluid can flow through the channels.

FIG. 4 diagrammatically shows a honeycomb body 6 according to the invention in cross section. According to the invention, the honeycomb body 6 is constructed from six layers 1. The layers 1 are fixed at least in partial regions to the outer casing tube 7 with a part of the corresponding fold lines 4, and are fixed at least in partial regions to the inner casing tube 8 with another part of the fold lines 4. In this case, it is preferable for a materially joined connection, such as for example a brazed and/or a welded connection, preferably a hard-soldered connection, to be formed between the outer casing tube 7 and the layers 1. Depending on the use of the honeycomb body 6, the connection between the layers 1 and the inner casing tube 8 can have a materially joined and/or form-locking and/or force-locking construction. In this case, a detachable connection can preferably be formed between the inner casing tube 8 and the layers 1, so that after the production of the honeycomb body 6, the inner casing tube 8 can be separated from the honeycomb body 6. The production of the honeycomb body 6 preferably takes place through the use of the connection between the layers 1 and the casing tubes 7, 8 and a subsequent relative rotation of the casing tubes 7, 8 with respect to one another. An embodiment of the method in which the inner casing tube 8 is rotated relative to the outer casing tube 7 is particularly preferable in this case. This results in a honeycomb body 6 which has a radial partial region 9 that includes channels 10 through which a fluid can flow.

In the present exemplary embodiment, the radial partial region 9 is a circular-ring-shaped radial partial region. Basically, according to the invention, this is an annular partial region 9 which is defined in such a way that the annular partial region 9 has channels 10, the partial region 9 is delimited at the outside and at the inside, and a region which has basically no layers 1 and/or channels 10 is formed in the interior of the partial region 9. The lines which delimit the partial region 9 at the inside and at the outside preferably run substantially parallel to one another. The invention is, however, not restricted to a circular-ring-shaped honeycomb body 6. In the present exemplary embodiment, the region situated in the interior of the inner casing tube 8 is formed without channels, although it is also possible for a further honeycomb body, with channels through which a fluid can flow, to be inserted in that region. The honeycomb body 6 is therefore composed of layers 1 having sections 2, 3 which at least partially have substantially an involute curvature.

Figure 5:
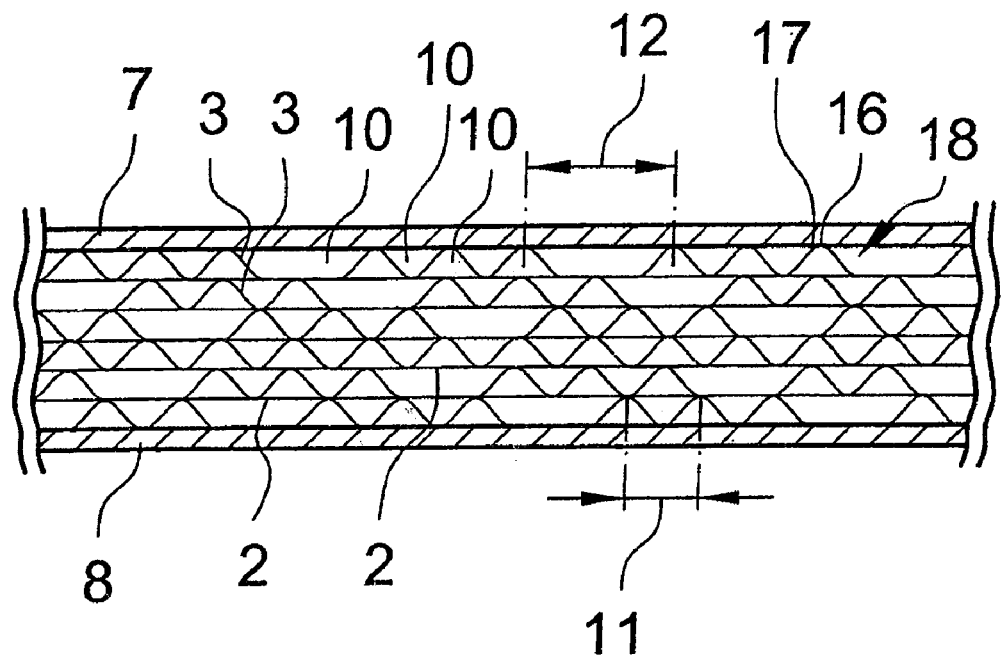
FIG. 5 is a fragmentary, longitudinal-sectional view of a portion of a honeycomb body according to the invention.

FIG. 5 shows, by way of example, a further embodiment of the present invention. This embodiment of the invention can be used not only in an annular honeycomb body 6, but in fact has a basic advantage which can be used in any type of honeycomb body that is constructed from metallic layers. FIG. 5 diagrammatically shows a portion of an annular honeycomb body with infinite inner and outer radii. Only one layer is shown, and only a portion thereof, and fold lines 4 are not shown therein. Instead of a single layer 1 with substantially smooth sections 2 and structured sections 3, it is also possible for a plurality of substantially smooth layers and structured layers to be provided. The structured sections 3 have a periodic structure which generally has a structure repeat length 11. In the case of fully periodic structures, the structure repeat length 11 corresponds to the period of the periodic structure. The portion of a honeycomb body 6 according to the invention which is shown has points at which there is an increased structure repeat length 12. As a result of that increased structure repeat length 12, the layer 1 can deflect and deform in the regions with the increased structure repeat length. In this way, the layer 1 can absorb pressure stresses. Pressure stresses of that type are generated, for example, as a result of a honeycomb body 6 heating up inhomogeneously. This can occur for example, in the case of use as a catalyst carrier body, due to a light-off temperature of the catalytic reaction being reached more quickly in partial regions of the honeycomb body 6 than in other regions. The regions in which the catalytic conversion is already taking place then heat up considerably more intensely than the other regions, since the reactions which are taking place are exothermic. The pressure stresses which are generated in this way can lead to damage, in the case of conventional honeycomb bodies 6 constructed from metallic layers, for example to cracks in the layers at the casing tube. That is prevented by the regions with the increased structure repeat lengths 12.

The pressure stresses also occur, in particular, in annular honeycomb bodies 6. The layers 1 can, at least in partial regions, include a metallic foil and can also, in other partial regions, have material through which a fluid can at least partially flow. It is thus possible, in particular, for a honeycomb body 6 to be produced which, in the direction in which a fluid can flow through the channels 10, is formed firstly from a metallic foil and then from a layer through which a fluid can at least partially flow. The formation of the entire layer 1 from a metallic foil is also preferable.

A fastening of the layer 1 to the outer casing tube 7 takes place at least at one fastening point 16. In this case, a fastening point 16 is also to be understood in particular to mean a linear fastening region which includes at least one part of the crest 17 of the structuring 18.

FIG. 5 shows that the regions with increased structure repeat length 12 are distributed in such a way that there is substantially no radius of the annular honeycomb body 6 which has none of the regions with increased structure repeat length 12. Pressure stresses which occur can therefore be distributed in a uniform manner radially.

The formation of regions with increased structure repeat length 12 can preferably take place in regions which form edge regions of a layer 1, as shown by way of example in FIG. 6. It is preferably possible for one or more structures to be omitted in the edge region, so that after the production of the honeycomb body, when the latter is constructed from a first layer 13 and a second layer 14, regions with increased structure repeat length 12 are formed in the edge regions of the layers 13,14. Due to the relative rotation of the inner casing tube 8 with respect to the outer casing tube 7, the regions with increased structure repeat length 12 are distributed over the cross section of the honeycomb body 6. A very effective absorption of pressure stresses is thus particularly advantageously permitted.

Figure 7:
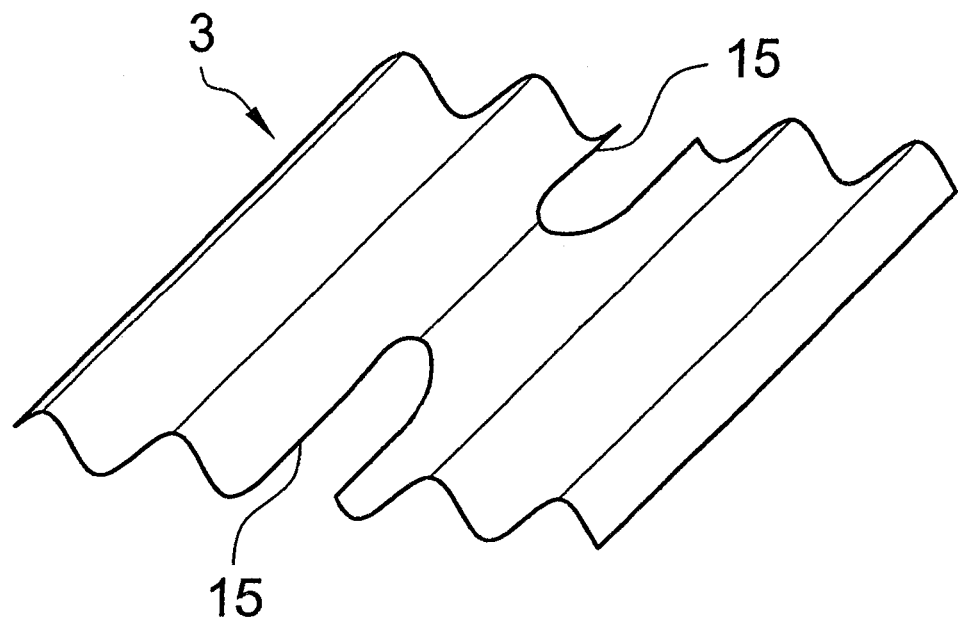
FIG. 7 is a fragmentary, perspective view of a portion of a further exemplary embodiment of a layer of a honeycomb body according to the invention.

FIG. 7 diagrammatically shows a portion of a structured section 3 of a layer 1 or of a structured layer. The structured section 3 has two recesses 15 which are formed in the section 3. As a result of these recesses, the layer 1 is capable of deforming under pressure stresses without damage occurring to the layer 1. The recesses 15 can be formed as an alternative or in addition to regions with increased structure repeat length 12.

Figure 8:
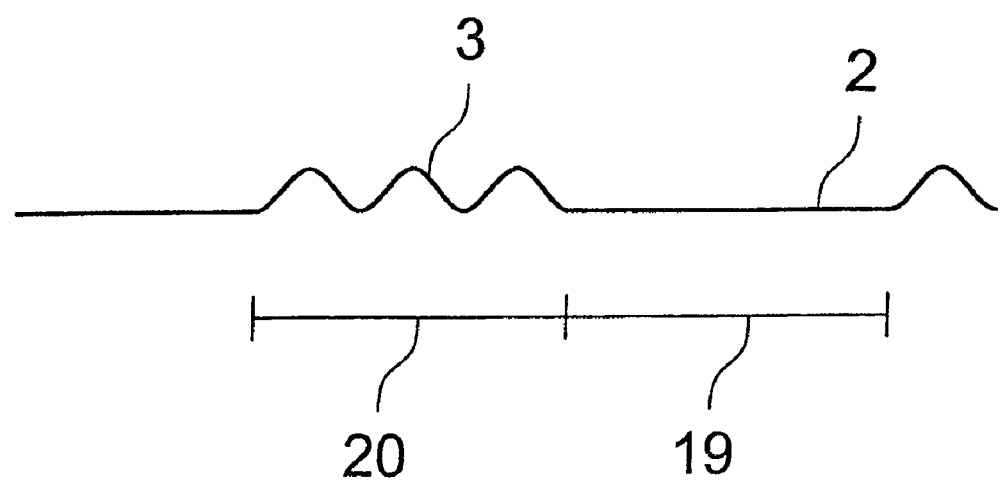
FIG. 8 is a side-elevational view of a layer with smooth and structured sections.

FIG. 8 diagrammatically shows a portion of a layer 1 with smooth sections 2 and structured sections 3. In this case, the smooth sections 2 have a first section length 19 and the structured sections 3 have a second section length 20. The first and second section lengths 19, 20 are different.

Figure 9:
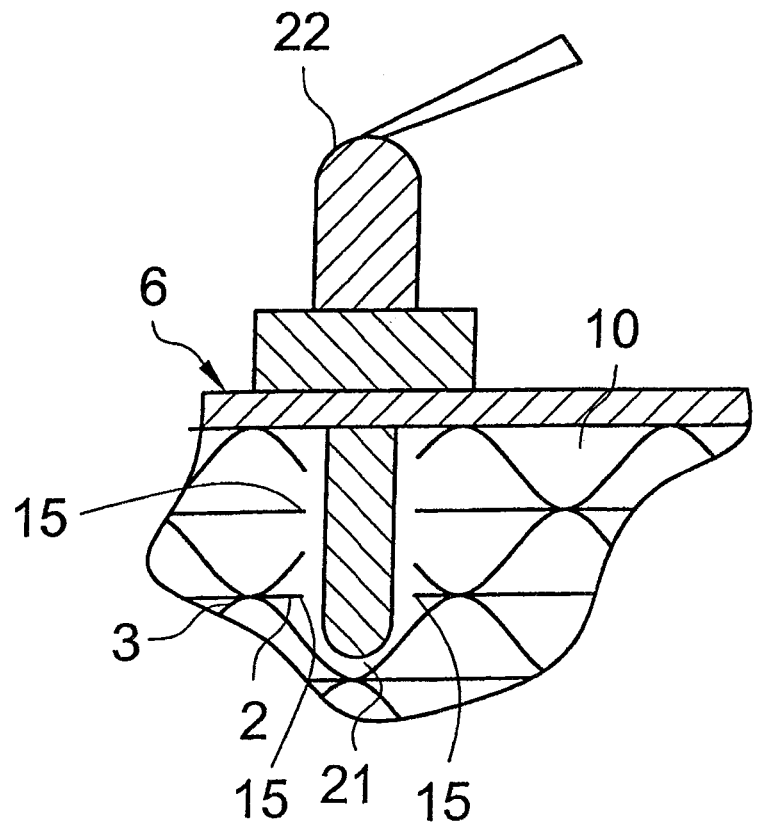
FIG. 9 is a fragmentary, longitudinal-sectional view of a portion of a further exemplary embodiment of a honeycomb body according to the invention.

FIG. 9 diagrammatically shows a portion of a honeycomb body 6 according to the invention. The sections 2, 3 have recesses 15 which form a coherent cavity 21. A measuring sensor 22, preferably a lambda probe, is inserted into the cavity 21.

Figure 10:
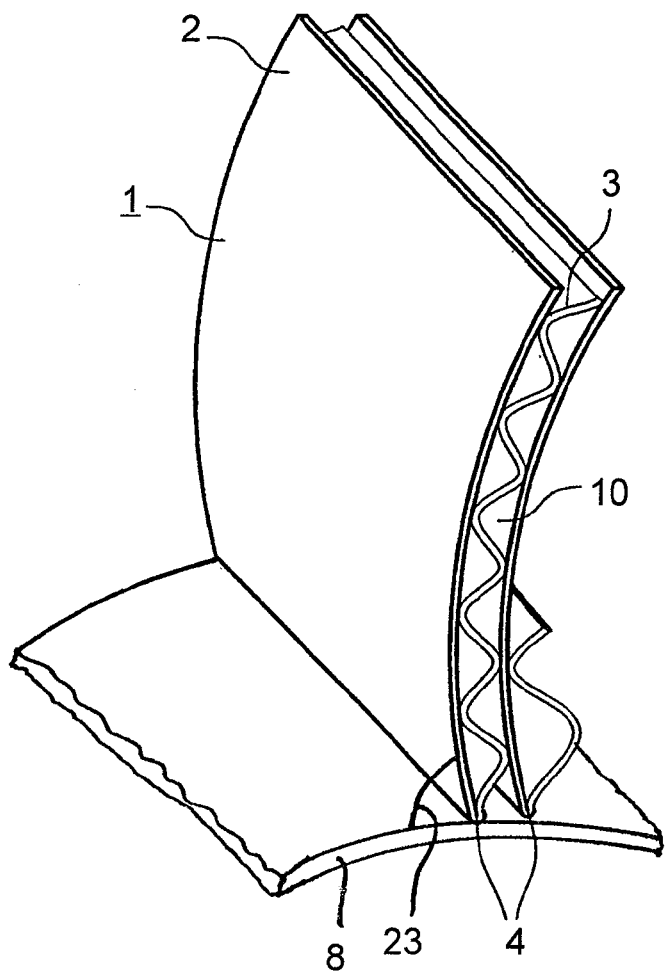
FIG. 10 is a fragmentary, perspective view of a section of a further exemplary embodiment of a honeycomb body according to the invention.
Figure 11:
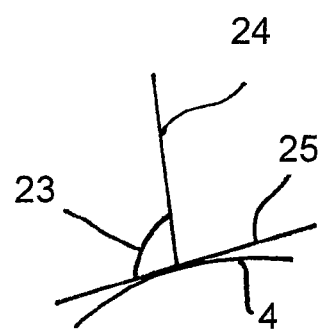
FIG. 11 is a diagram illustrating a definition of a contact angle.

The exemplary embodiment of a honeycomb body 6 according to FIG. 10 substantially corresponds to the exemplary embodiment of FIG. 5, with an inner casing tube 8 also being shown therein, against which the layer 1 bears with the fold lines 4. In this case, the smooth sections 2 form a contact angle 23 with the inner casing tube 8. The contact angle 23 is, in particular, between 90 and 110°. The contact angle 23 is in particular defined, as can be seen from FIG. 11, as the angle between a first tangent 24 of a smooth section 2 in the region of the fold line 4 or in the region of contact against the inner casing tube 8, and a second tangent 25 of the inner casing tube 4 at that point.

An embodiment is also preferable in which, when the honeycomb body 6 is formed from a single layer 1 which has N smooth sections 2 and an identical number N of structured sections 3, the following equation is substantially satisfied:

$$L \cdot N \cdot (W+T) = 0.25 \cdot \pi (D^2 - d^2)$$

In this case, L is the length of the smooth section 2, N is the number of smooth sections 2, W is the corrugation height, T is the foil thickness, D is the inner diameter of the outer casing tube 7 and/or the outer diameter of the honeycomb body 6, and d is the inner diameter of the honeycomb body 6 and/or the outer diameter of the inner casing tube 8.

In an embodiment which is alternatively and/or additionally preferable, in which the honeycomb body 6 is constructed from a single layer 1, and there is a number N of smooth sections 2 and structured sections 3, the following equation is satisfied:

$$N \cdot (W+T) = 0.5 \cdot (D-d),$$

where the variables N, W, T, D and d are as defined above.

The method according to the invention for producing a honeycomb body 6 and the honeycomb body 6 according to the invention, advantageously permit the provision of an annular honeycomb body 6 with low material expenditure and good durability.

The invention claimed is:

1. A honeycomb body, comprising:
    an outer casing tube;
    one single metallic layer fastened at least at one fastening point to said outer casing tube, said metallic layer having substantially smooth and structured sections separated from each other by fold lines and folded onto one another, said substantially smooth sections between said fold lines having at least one first section length, said structured sections between said fold lines having at least one second section length differing from said first section length, said sections each having a substantially involute curvature; and
    an annular radial partial region with channels through which a fluid can flow.

2. The honeycomb body according to claim 1, which further comprises an inner casing tube to which said metallic layer is connected at least in partial regions.

3. The honeycomb body according to claim 1, wherein said sections of said metallic layer are separated by fold lines, every second fold line is situated on one side of said metallic layer and at least one of said fold lines situated on said one side of said metallic layer is connected at least in partial regions to said outer casing tube.

4. The honeycomb body according to claim 1, wherein said structured sections have structures with a structure repeat length, and said structure repeat length is increased at least at one point of said metallic layer.

5. The honeycomb body according to claim 1, wherein at least one structured section has at least one recess.

6. The honeycomb body according to claim 5, wherein said smooth and structured sections have recesses forming a coherent cavity.

7. The honeycomb body according to claim 1, which further comprises a materially joined connection at said at least one fastening point.

8. The honeycomb body according to claim 1, which further comprises at least one of the following connections including a materially joined connection:
   a) a connection of said metallic layer to an inner casing tube;
   b) a connection of said metallic layer to said outer casing tube;
   c) a connection of said metallic layer to itself; and
   d) a connection of a layer to an adjacent layer of said metallic layer.

9. The honeycomb body according to claim 1, wherein said structured sections have only one structure amplitude.

10. The honeycomb body according to claim 1, wherein said metallic layer, with said fold lines separating said sections from each other, has a parallelogram-shaped cross section.

11. A method for producing a honeycomb body, the method comprising the following steps:
   providing one single metallic layer with substantially smooth and structured sections separated from each other by fold lines;
   providing the substantially smooth sections between the fold lines with at least one first section length and providing the structured sections between the fold lines with at least one second section length differing from the first section length;
   providing each of the sections with a substantially involute curvature;
   folding the sections of the metallic layer onto one another;
   fastening the metallic layer at least at one fastening point to an outer casing tube; and
   forming the honeycomb body from the metallic layer with an annular radial partial region having channels through which a fluid can flow.

12. The method according to claim 11, which further comprises connecting the layer to an inner casing tube, and rotating the casing tubes relative to one another during production.

13. The method according to claim 12, wherein the connection between the layer and the inner casing tube is detachable.

14. The method according to claim 13, which further comprises removing the inner casing tube after the rotating step.

15. The method according to claim 11, which further comprises separating the sections of the layer by fold lines, with every second fold line being situated on one side of the layer and at least one of the fold lines situated on the one side of the layer including at least one fastening point.

16. The method according to claim 11, which further comprises forming the structures in the layer in a substantially periodic manner, with the structures having a structure repeat length, and with the structure repeat length being increased at least at one point of the layer.

17. The method according to claim 11, which further comprises forming at least one recess in at least one structured section.

18. The method according to claim 17, which further comprises forming recesses in the smooth and structured sections to provide a coherent cavity after the folding.

19. The method according to claim 11, which further comprises delimiting the layer with a structured section being shorter than other sections.

20. The method according to claim 11, which further comprises fastening the layer at the at least one fastening point by a material joining process.

21. The method according to claim 11, which further comprises generating at least one of the following connections in a materially joined manner at least in partial regions of the honeycomb body:
   a) a connection of the layer to an inner casing tube;
   b) a connection of the layer to the outer casing tube;
   c) a connection of the layer to itself; and
   d) a connection of a layer to an adjacent layer of the layer.

\* \* \* \* \*